G. L. PATTERSON.
BATTERY AND HOLDER.
APPLICATION FILED MAY 26, 1908.
964,687.
Patented July 19, 1910.
2 SHEETS—SHEET 1.
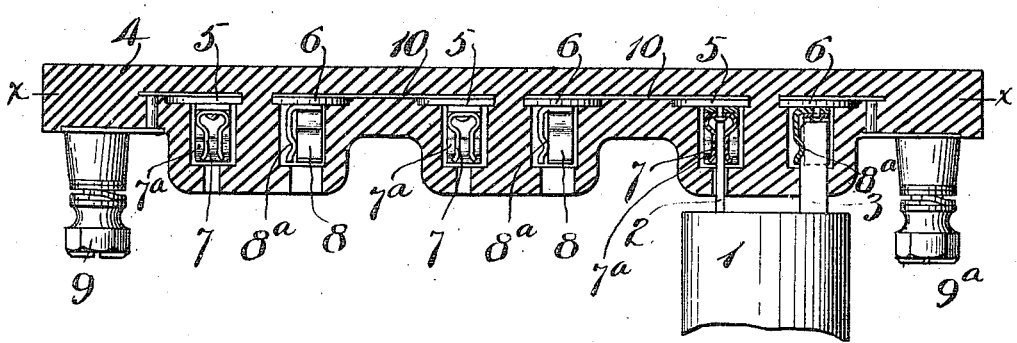
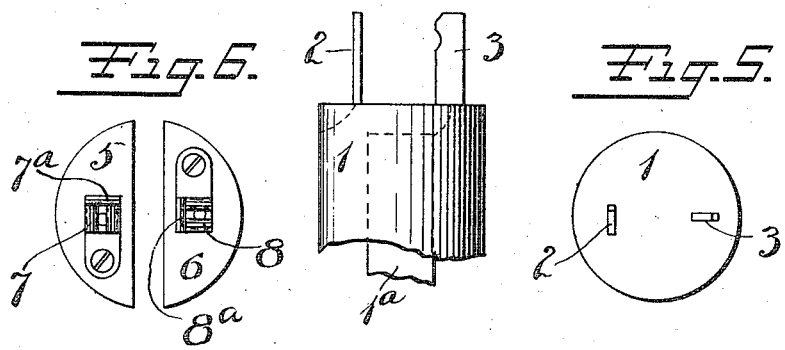
Witnesses:
Inventor
G. L. PATTERSON
By his Attorneys G. L. PATTERSON.
BATTERY AND HOLDER.
APPLICATION FILED MAY 26, 1908.
964,687.
Patented July 19, 1910.
2 SHEETS—SHEET 2.
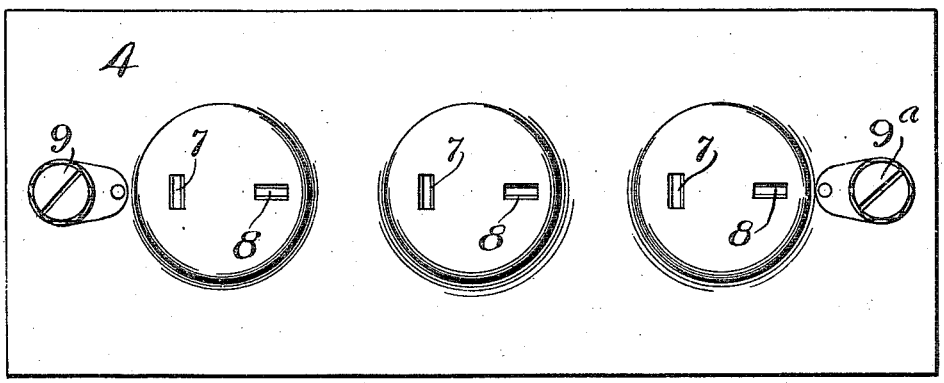
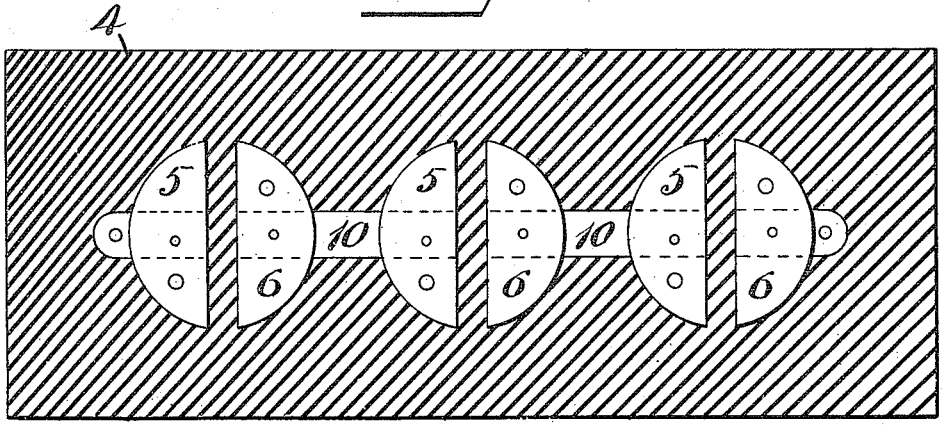
Witnesses:
Inventor
G. L. PATTERSON
By his Attorneys

UNITED STATES PATENT OFFICE.

GEORGE LEWIS PATTERSON, OF NEW YORK, N. Y., ASSIGNOR TO ALICE C. PATTERSON, OF NEW YORK, N. Y.

BATTERY AND HOLDER.

964,687.

Specification of Letters Patent. Patented July 19, 1910.

Application filed May 26, 1908. Serial No. 435,123.

*To all whom it may concern:*

Be it known that I, GEORGE LEWIS PATTERSON, a citizen of the United States, residing at New York, N. Y., have invented certain new and useful Improvements in Batteries and Holders, of which the following is a full, clear, and exact description.

My invention relates to improved batteries and holders therefor.

The battery is of the dry battery type, the object being to provide improved construction whereby the same may be quickly cut into or out of circuit. The holder adapted thereto and arranged to coöperate therewith is of improved construction, and is arranged to receive and engage the battery cell so as to put the electrodes thereof in proper electrical connection with the circuit by the mere act of pushing said battery into place.

In the form shown, the battery has no binding posts, and hence the necessity of attaching and detaching terminal wires to the battery direct is eliminated, this connection being made through the medium of binding posts carried by the holder. The construction is also such that reversed polarity is impossible, a feature of great value where a plurality of battery units are to be connected in series.

In the drawings, Figure 1 is in the main a longitudinal sectional view of a holder of the three unit type, that is, a holder adapted to receive three battery cells and connect them in series; Fig. 2 is a view of the under side of the same; Fig. 3 is a section of the holder on the plane of the line *x—x* of Fig. 1; Fig. 4 is a view of the upper end of a battery cell, detached; Fig. 5 is a plan view of said cell; Fig. 6 is a view of the under side of a detached set of bed-plates and sockets adapted to a single unit.

1 represents a battery cell, of the usual well-known dry battery construction. 2—3 are terminals projecting from one end thereof and electrically connected respectively with the positive and negative pole or electrode of the battery, in any well-known manner. These terminals are also mechanically connected with the battery in any wellknown manner, so as to be firmly held. To prevent reversing polarity, these terminals 2—3, while they may be of corresponding shape, are non-symmetrical in arrangement, relatively to each other, for example, terminal 3 is turned at a different angle or plane from the angle or plane of terminal 2. To accomplish the same end, the size or shape of these terminals might be different. Each of these terminals may be notched at one or both edges, as desired, for the purpose of frictional engagement with a retaining clip, hereinafter described.

4 is a holder or insulated head of suitable form, adapted to receive one or more battery units. This head may be made of any suitable insulating material, but preferably of a molded insulating material in which the sockets for each pair of terminal units are rigidly carried by bed-plates 5—6, of substantial area, insulated from one another and securely anchored to, or embedded in, the material of the holder 4.

7—8 are sockets mounted respectively upon the bed-plates 5—6 and secured thereto in any well known manner. 9—9$^a$ are binding posts secured to the holder 4. These binding posts are respectively connected to the positive and negative socket terminals, and where more than one set of socket terminals are arranged in series the negative terminal of one is connected with the positive terminal of another, as by means of connector strips 10—10, which may also be enveloped in the insulating material of the holder 4. The sockets 7—8 are so positioned as to mechanically coöperate with the battery terminals 2—3, said sockets facing up in such a manner as to receive said terminals when a battery is to be inserted. Each socket may include a retaining clip 7$^a$—8$^a$, each of which is provided with a projection arranged to engage the notched edge of its respective battery terminal to thus frictionally hold said terminal, and, in turn the battery, in place.

In Fig. 4 I have conventionally shown by dotted lines that one of the terminals 2 is electrically connected to the outer wall or cup of the battery 1, this ordinarily being one of the electrodes, while the other terminal 3 is electrically connected to the central carbon 1$^a$, this ordinarily being the opposite electrode of the battery.

From the foregoing it is apparent that a quick connection of the battery unit may be made with the holder, whereby a new battery may be quickly introduced or substituted for an old one. The holder itself may be attached to any superposed structure, for instance, an overhead beam in a cellar. The main circuit wires being attached to the binding posts 9—9ª on the frame, one may readily renew the battery power with great ease and without the necessity of a skilled assistant, by simply pulling out one unit and pushing in a new one.

What I claim is:

1. In a holder for a battery, an insulating head, a holder element comprising two socket members anchored in said head and insulated from each other, a battery cell, and two terminals adapted to said sockets respectively, said sockets and terminals being non-symmetrical in arrangement to prevent reversal of polarity.

2. In a holder for a battery, an insulating head, a socket including two bed-plates anchored in said head and insulated from each other, a terminal clip carried by each of said plates and arranged side by side, a battery cell and two terminals arranged at one end thereof and side by side and positioned to correspond with the clips carried by said bed-plates, said clips being non-symmetrical in arrangement to prevent reversal of polarity.

GEORGE LEWIS PATTERSON.

Witnesses:
R. C. MITCHELL,
R. W. CARROLL.